(12) United States Patent
Kessels et al.

(10) Patent No.: US 7,519,759 B2
(45) Date of Patent: Apr. 14, 2009

(54) PIPELINE SYNCHRONISATION DEVICE

(75) Inventors: Jozef Laurentius Wilhelmus Kessels, Eindhoven (NL); Adrianus Marinus Gerardus Peeters, Eindhoven (NL); Suk Jin Kim, Kwangju (KR)

(73) Assignee: Koninklijke Philips Electronics N.V., Eindhoven (NL)

( * ) Notice: Subject to any disclaimer, the term of this patent is extended or adjusted under 35 U.S.C. 154(b) by 288 days.

(21) Appl. No.: 10/542,906

(22) PCT Filed: Jan. 14, 2004

(86) PCT No.: PCT/IB2004/050024

§ 371 (c)(1),
(2), (4) Date: Jul. 20, 2005

(87) PCT Pub. No.: WO2004/066142

PCT Pub. Date: Aug. 5, 2004

(65) Prior Publication Data

US 2006/0076988 A1    Apr. 13, 2006

(30) Foreign Application Priority Data

Jan. 24, 2003   (EP) ................. 03075239

(51) Int. Cl.
*G06F 13/36* (2006.01)
*G06F 5/00* (2006.01)
(52) U.S. Cl. ........................ 710/310; 710/52
(58) Field of Classification Search ............ 710/52, 710/310
See application file for complete search history.

(56) References Cited

U.S. PATENT DOCUMENTS 5,389,835 A * 2/1995 Yetter ................. 326/98
5,392,423 A * 2/1995 Yetter ................. 713/503
5,964,866 A * 10/1999 Durham et al. ......... 712/200

FOREIGN PATENT DOCUMENTS

WO    0195089 A2    12/2001
WO    0235346 A1    5/2002

OTHER PUBLICATIONS

Mousetrap: Ultra-High-Speed Transition-Signaling Asynchronous Pipelines; Singh et al.; Proceedings 2001 International Conference on Computer; Sep. 23-26, 2001; pp. 9-17.*
Jakov N. Seizovic, et al: Pipeline Synchronization, IEEE 1994.
IBM Technical Disclosure Bulletin: Pulse Synchronizer Circuit, vol. 20, No. 1, Jun. 1977, pp. 288-289 XP002351646.
Montek Singh, et al: Mousetrap: Ultra-High_Speed Transition-Signaling Asynchronous Pipelines, IEEE COMP, SOC Sep. 2001, pp. 9-17, XP010560958.

* cited by examiner

*Primary Examiner*—Paul R Myers
*Assistant Examiner*—Jeremy S Cerullo
(74) *Attorney, Agent, or Firm*—Larry Liberchuk

(57) ABSTRACT

Pipeline synchronization device for transferring data between clocked devices having different clock frequencies. The Pipeline synchronization device comprises a mousetrap buffer for exchanging data with one of said external devices said mousetrap buffer having a signalling output for coordinating the data exchange with the external device. The pipeline synchronization device comprises further a synchronizer adapted to synchronizing the change in a signalling output with the clock of the external device.

15 Claims, 6 Drawing Sheets

Figure 1:
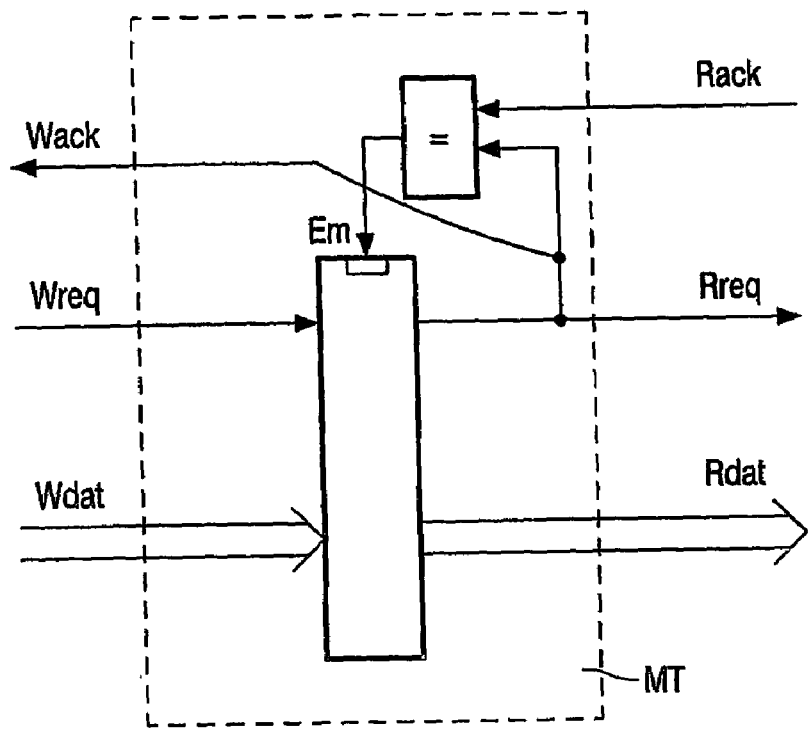

Rack (MT1) = Wack (MT2) = Ack
Rreq (MT1) = Wreq (MT2) = Req
Rdat (MT1) = Wdat (MT2) = Dat

PIPELINE SYNCHRONISATION DEVICE

The present invention relates to a pipeline synchronisation device for transferring data between clocked devices having different clock frequencies.

Future developments undermine the role of globally clocked VLSI circuits. VLSI stands for very large scale integration. VSLI circuits have between 100,000 and 1 million transistors on a chip. Global clocking means, that all the components of the circuits are driven with the same clock frequency. The trend towards the system on chip designs leads to chips containing several modules, which are driven with different clock frequencies. In future technologies it will come increasingly difficult to distribute high speed low skew clock signals. Skew stands for a change of timing or phase in the clock signal, which is a result of the time it takes for the signal to travel to the modules. Therefore, future chips will contain several locally clocked submodules, which communicate which each other. These systems are called GALS (globally asynchronous, locally synchronous) systems. Two kinds of systems can be distinguished depending on the way the synchronous submodules communicate.

In a clock synchronization system, the submodules have so called plausible clocks, which are ring oscillators that can be halted. Safe communication is obtained by synchronizing the clocks.

In a data synchronization system, the submodules have free running clocks and the data being communicated from one clock to the other is synchronized. Such a data synchronization system is known from J. N. Seizovic pipeline synchronization, in Proceedings International Symposium on advanced research in asynchronous circuits and systems, pages 87 to 96, November 1994. A pipeline synchronization buffer, consists of three sections: a write section, an intermediate section and a read section. The write section synchronizes the input operations with the write clock, while the read section synchronizes the output operations with the read clock. The intermediate section is an asynchronous buffer, which serves to decouple the two synchronizing sections. The design of all three sections is based on ripple buffers (asynchronous buffer). The transformation from a ripple buffer into a synchronizing buffer is presented in "pipeline synchronization" by J. N. Seizovic. This transformation is based on inserting in-between two neighbouring cells a component that synchronizes the handshakes with the clock phase. The basic wait component (called wait 4), delays the completion of a four-phase-handshake until an additional signal clock is high. Since signal clocks can go low when the handshake starts, a conflict can occur implying that a so called arbiter is needed in the design of the component. A basic arbiter (also called mutual exclusion element) has two incoming request signals and two outgoing acknowledge signals. An acknowledge signal goes high when the corresponding request signal goes high and it goes low when the request signal goes low. But there is one restriction: At most one of the acknowledge signals may be high. If one of the acknowledge signals is high and the other request signal goes high, the arbiter ignores the other request signal, until the acknowledge signal goes low. When both request signals go high simultaneously, the arbiter has to decide which acknowledge signal should go high first. When making the decision, the arbiter may remain in a metastable state for an unbounded period of time.

Figure 6:
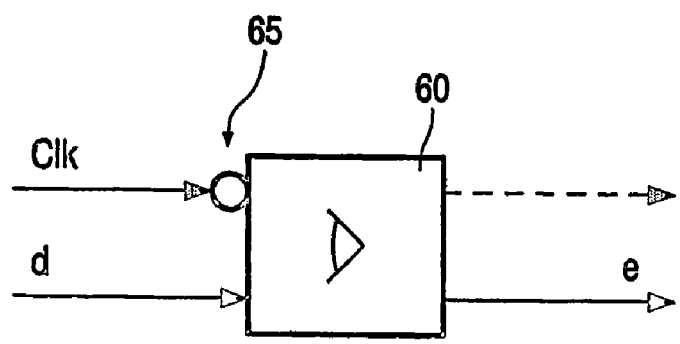

FIG. 6 shows the design of the wait 4-component based on a basic arbiter. The wait 4-component consists of a basic arbiter 60 and an inverter 65. An inverted clock signal is input in the basic arbiter 60. The acknowledge signal of the basic arbiter corresponding to the inverted clock signal is not used in the wait 4-component. Whenever the inverted clock signal is high and the corresponding output signal is high, the acknowledge signal e corresponding to the request signal d in FIG. 6 is low, irrespective of the request signal d. The acknowledge signal e may only go from low to high if the inverted clock signal is low, i.e. the clock is high. An up-edge in signal d is only transferred during the high phase of the clock. A falling edge in signal d is transferred immediately to signal e.

FIG. 1 shows the design of a conventional mousetrap buffer, which is a ripple buffer using two phase single rail handshake signalling for the communication between neighbouring cells. Each cell has two signalling outputs, a read request signal (Rreq) and a write acknowledge signal (WACK). The mousetrap buffer has two signaling inputs: a write request input (Wreq) and a read acknowledge input (Rack). The read request output and the read acknowledge input are connected to an EXNOR-gate. The output of the EXNOR-gate controls a register of the mousetrap buffer. If the signal en is high, all latches in the buffer are transparent, which means that the outputs of the latches are equal to the inputs. In this state data may be written to the mousetrap buffer. If the signal en goes low, the latches of a mousetrap buffer are made opaque. As long as the buffer is opaque, no data may be transferred to the buffer. A communication in a two-phase phase handshake protocol consists of only two handshake events: first the sender indicates by means of a transition in a so-called request signal that new data is being offered. Then the receiver indicates by means of a transition in an acknowledge signal that the data has been received. It is important to acknowledge, that the change in the request signal and the change in the acknowledge signal indicate the respective events. The transition in the request signal and the acknowledge signal may be either an up-edge or a down-edge transition of the signal. Each two-phase communication inverts the handshake signal therefore. This is in contrast to a four-phase handshake communication, which leaves the signals invariant. The four-phase handshake always starts with both signals low. The two-phase handshakes start with both signals equal (either high or low). In the mousetrap buffer, the request signals are used to pass on data items (full buckets) and the acknowledge signals are used to make a full buffer empty (give back empty buckets). Passing a data item (full bucket) is done via the request signals, whereas the acknowledge signals are used to return an empty bucket. When data has been written to the mousetrap buffer, the write acknowledge signal is made equal to the write request signal. Thereby an empty bucket is returned to the preceding mousetrap buffer and a full bucket is transferred to succeeding mousetrap buffer.

The mousetrap buffer has several properties that make it very attractive for pipeline synchronization in GALS systems.

In many GALS (globally asynchronous, locally synchronous) systems the clock also implies distances, in which case the transmission delays are important. For this reason the two-phase protocol is more attractive than a four-phase protocol. The mousetrap buffer is fast, which means that it allows high clock rates in the synchronizing buffers. Moreover, for a given clock frequency, a faster buffer has more time to deal with metastable states which results in a smaller possibility of synchronization failure. An empty mousetrap buffer has a latency of only one latch delay per cell.

Figure 2:
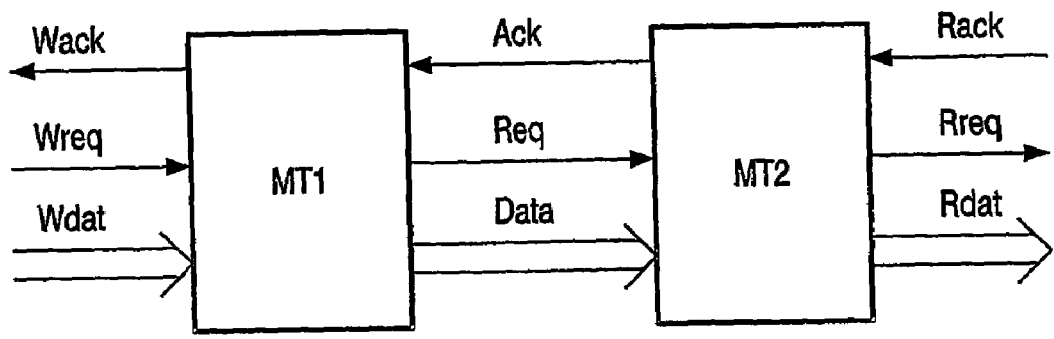

FIG. 2 shows how two mousetrap cells MS 1 and MS 2 are connected to each other, in order to form an asynchronous (self-timed) pipeline. The read acknowledge input of mousetrap 1 is connected to the write acknowledge output of mousetrap 2. The read request output of mousetrap 1 is equal to the write request input of a mousetrap 2. The read data out of mousetrap 1 is equal to the write data input of mousetrap 2. Such a buffer cannot be used to bridge clock domains because the handshake signals may change asynchronously (may not meet set up and hold requirements).

It is therefore an object of the present invention to provide a pipeline synchronization device, which operates fast and reliably.

The object is achieved by a pipeline synchronization device for transferring data between clocked external devices having different clock frequencies. The pipeline synchronization device comprises a mousetrap buffer for exchanging data with one of the external clock devices. The mousetrap device may either read or mix data from an external device or write data to an external device. The mousetrap buffer has a signalling output for reconciling the data exchange with the external device. The signalling output may be either a write acknowledge signal to an external device, that writes data into the mousetrap buffer, or a read request signal for transferring data to an external device. The synchronizer is adapted to synchronizing the change in a signalling output with the clock of the external device. The change in the signalling output may be either an up edge or a down edge signal. The mousetrap buffer is a ripple buffer. The signalling outputs may change asynchronously. Therefore, the mousetrap buffer may not communicate with an internally clocked device. Due to the synchronizer, the signalling output of the mousetrap buffer may meet set-up and hold requirements of the external device made. In this way the mousetrap buffer may be used in pipeline synchronization.

The synchronizer may be adapted to synchronizing the changing signalling output with a high phase or a low phase of the clock of the external device. In other words, an up edge or a down edge in the signalling output is only transferred, if the clock of the external device is either high or low. To this end, the synchronizer delays a transfer of the change in the signalling output until the clock of the external device is either high or low. If the clock is either high or low to begin with, i.e. when the change in the signalling output occurs, the synchronizer does not delay the transfer. In this way the set-up and hold requirements of the external device may be met.

Preferably the synchronizer comprises a synchronizing latch. The synchronizing latch has a synchronizing input for receiving the signalling output. The latch further comprises a synchronizing output for outputting the received signalling output to the external device and a control input for enabling the output of this received signalling output to the external device. When the control input is high, the latch becomes transparent and the signal input to the latch becomes equal to the signalling output from the latch. The synchronizing latch is used for delaying the transfer of a change in the signalling output, until the control input enables the latch.

The synchronization of the control input with a clock phase of the external device may be accomplished in the following way: the synchronizer further comprises an EXNOR-gate. The EXNOR-gate has two inputs and one output. The inputs of the EXNOR-gate are connected to the synchronizing input and output of the synchronizing latch. If no change in the signalling output of the mousetrap buffer occurs, the inputs and outputs of the EXNOR-gate are equal. Consequently, the EXNOR-gate is closed, i.e. the output of the EXNOR-gate is low. If the signalling output of the mousetrap buffer changes, the input and output of the synchronizing latch will differ. Consequently, the EXNOR-gate is opened, i.e. the output of the EXNOR-gate is high. The synchronizer further comprises a wait-component, which is connected to the output of the EXNOR-gate and the clock of the external device. The output of the wait-component is connected to the control input of the synchronizing latch. The wait-component synchronizes the control input of the synchronizing latch with a phase of the clock of the external device. Preferably the wait-component is adapted to outputting the change from low to high in the input only, if the clock of the external device is high. The output of the wait-component remains low if the clock of the external device is low, even if the input of the wait-component is high. The output of the wait-component remains high, if the input is high, is respective of the state of the clock. A change from high to low in the input is output immediately is respective of the state of the clock of the external device. Therefore, a high output of the EXNOR-gate is only transferred to the control input, if the clock is high. Thereafter the control input remains high as long as the EXNOR-gate is high. The EXNOR-gate is low, if the synchronizing input and synchronizing output of the synchronizing latch are equal. A high control input equalizes the synchronizing input and the synchronizing output.

Preferably the wait-component comprises an inverter and an arbiter. An arbiter has two inputs and two outputs. In general, an output signal of the arbiter goes high, if the corresponding input signal goes high and the output signal goes low, if the corresponding input signal goes low. But there is a exception to this rule due to the restriction, that at most one of output signals may be high. If one of the input signals is high and the other input signal goes high, the arbiter ignores the other input signal. This means that the output signals remain unchanged. The output signal corresponding to the other input signal remains low. One of the inputs of the arbiter receives the inverted clock signal of the external device. The inverter inverts the clock signal. The other input of the arbiter is adapted to receiving the output of the EXNOR-gate. The output of the arbiter corresponding to the EXNOR-gate input is used for transmitting the input. The other output of the arbiter has no function in the wait-component. If the clock signal of the external device is low, the corresponding input of the arbiter is high.

The previously discussed implementations of the present invention relate to phase synchronization. This means that the change in the signalling output is synchronized with a high phase or a low phase of the clock of the external device. Preferably the synchronizer may be adapted to synchronizing the change in the signalling output with a rising and/or a falling edge of the clock of the external device. An edge synchronizer may be put into practice by the use of two-phase synchronizers, which are each adapted to delaying a transfer of a change in the signalling output until the clock of the external device is either high or low. Two mousetrap buffers are provided. A first mousetrap buffer is connected to the external device and a second mousetrap buffer is connected to the first mousetrap buffer. A first synchronizer of the two synchronizers synchronizes the signalling output of the first mousetrap buffer to the external device with an up phase or a low phase of the external clock. The second synchronizer synchronizes the signalling output of the second mousetrap to the first mousetrap buffer with the other phase of the external clock. The signalling input to the first mousetrap buffer is synchronized for example with a low phase of the external clock. The signalling output of the first mousetrap buffer is generated in response. In general, the signalling output will be transmitted to the first synchronizer during the low phase of the external clock. The first synchronizer delays the transfer of the signalling output to the first mousetrap buffer, until the external clock is high. In this example, the signalling output of the first mousetrap buffer is synchronized with the up edge of the external clock.

The latch synchronizer may also be implemented by using two wait-components. Each of the two wait-components synchronizes a change in the input with a phase of an external clock. Both wait-components have two inputs. One input for receiving an external clock and another input for receiving a signal to be transmitted. The change in the input signal is only transmitted, if the received clock signal is high. Once the output of such a wait-component is high, it remains high until the input signal changes from high to low, irrespective of the state of the received clock. The two wait-components are connected with each other. The first wait-component outputs a signal to the external device and the second wait-component receives the signalling output from the mousetrap buffer. The second wait-component receives an inverted clock from the external device, whereas the first wait-component receives the clock of the external device. The second wait-component transmits a change from low to high in the signalling output to the first wait-component, only during a low phase of the external clock. The first wait-component transmits a change in the output of the second wait-component only during a high phase of the external clock. Therefore, the signalling output is synchronized with the up edge of the external clock. The synchronization only takes place for the up edge of the signalling output, since the wait-components do not synchronize a change from high to low in the inputs with an external clock phase.

In order to synchronize both an up edge and a down edge of the signalling output with an external clock edge, further components are needed. To this end the synchronizer comprises a synchronizing latch having a synchronizing input and a synchronizing output. The synchronizing input receives the signalling output of the mousetrap buffer. The synchronizing output is connected to the external device. The synchronizing latch further has a control input. A change between the synchronizing input and synchronizing output of the synchronizing latch is only transferred to the external device, if the control input of the synchronizing latch is high. If the control input is high, the synchronizing output of the latch is made equal to the synchronizing input. The synchronizing input and the synchronizing output of the synchronizing latch are both connected to the inputs of an exclusive nor-gate. The output of the EXNOR-gate is low, as long as the synchronizing inputs and outputs are equal. The output of the EXNOR-gate is high, if the synchronizing input and synchronizing output differ. A high EXNOR-gate output indicates a change in the signalling input provided to the synchronizing latch. The output of the EXNOR-gate is used for controlling the latch. If the output of the EXNOR-gate is synchronized with a clock edge of the external device, then it enables a transfer and a change of the signalling output is synchronous with the edge of the clock.

The embodiments of the present invention are described below with reference to the accompanied drawings.

FIG. 1 shows a mousetrap buffer according to the state of the art.

Figure 3:
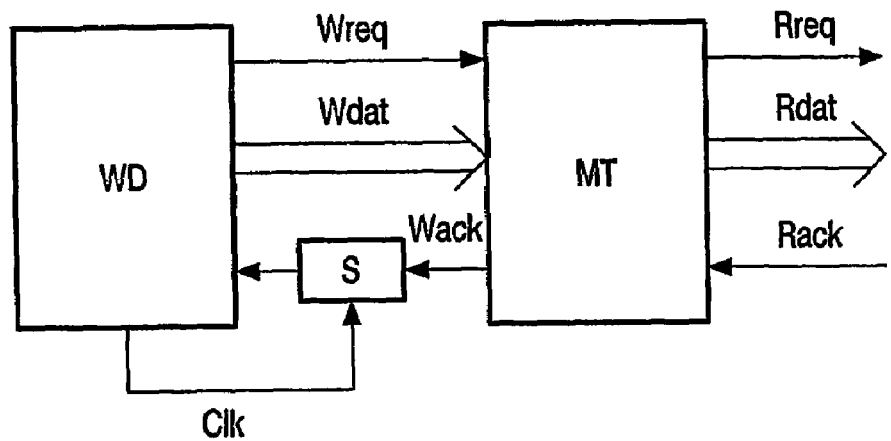
Figure 4:
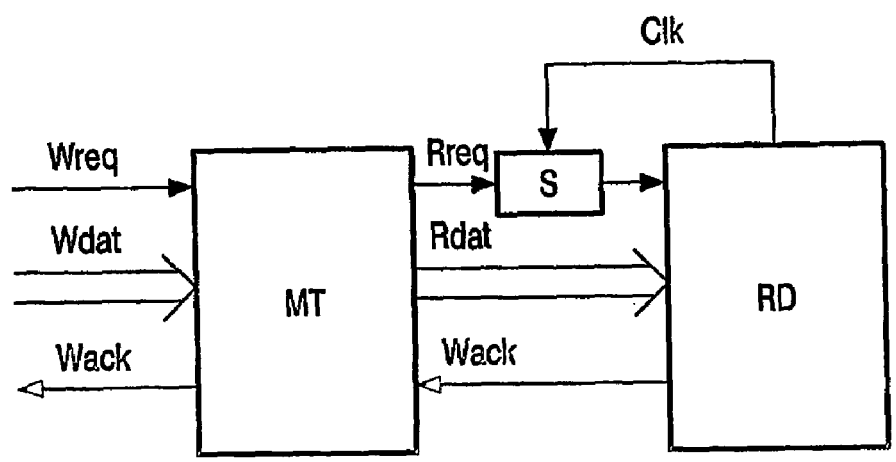
Figure 5:
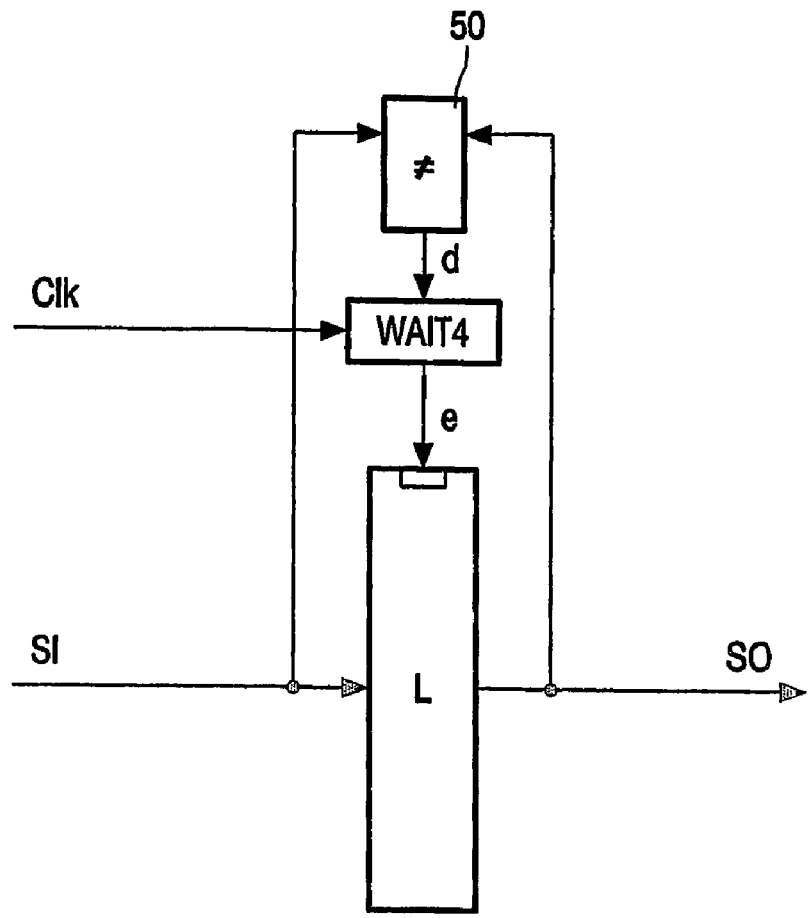
Figure 7:
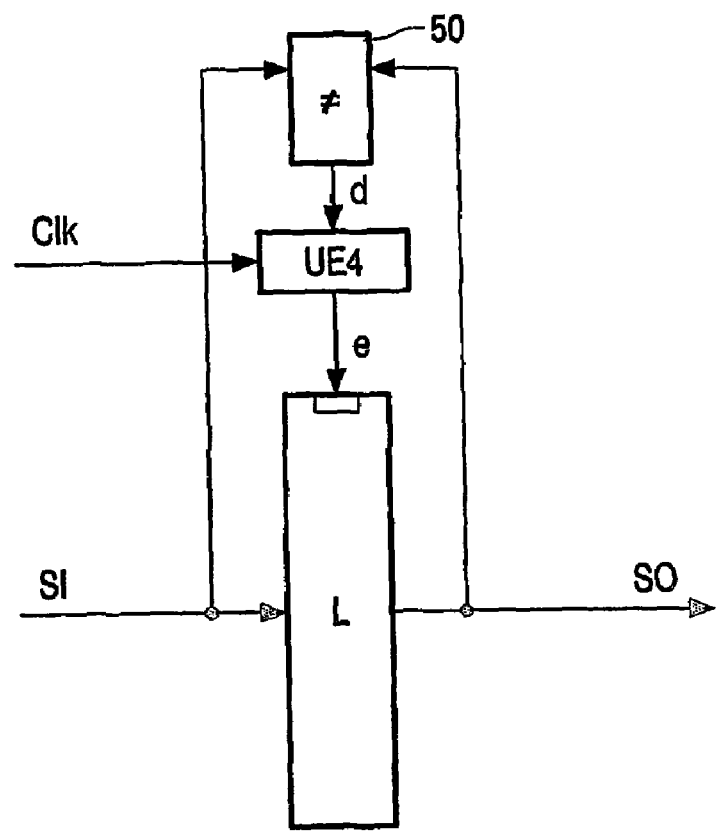
Figure 8:
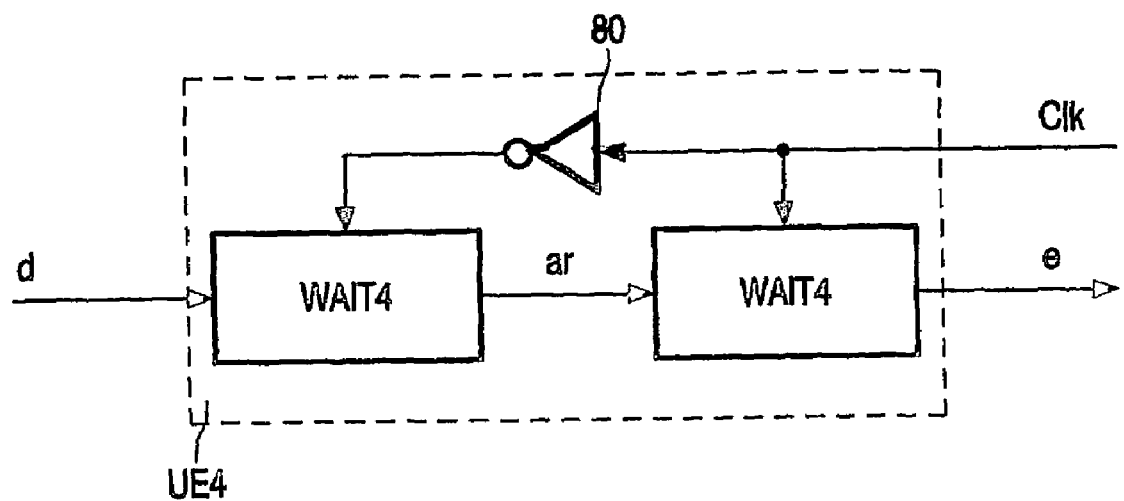
Figure 9:
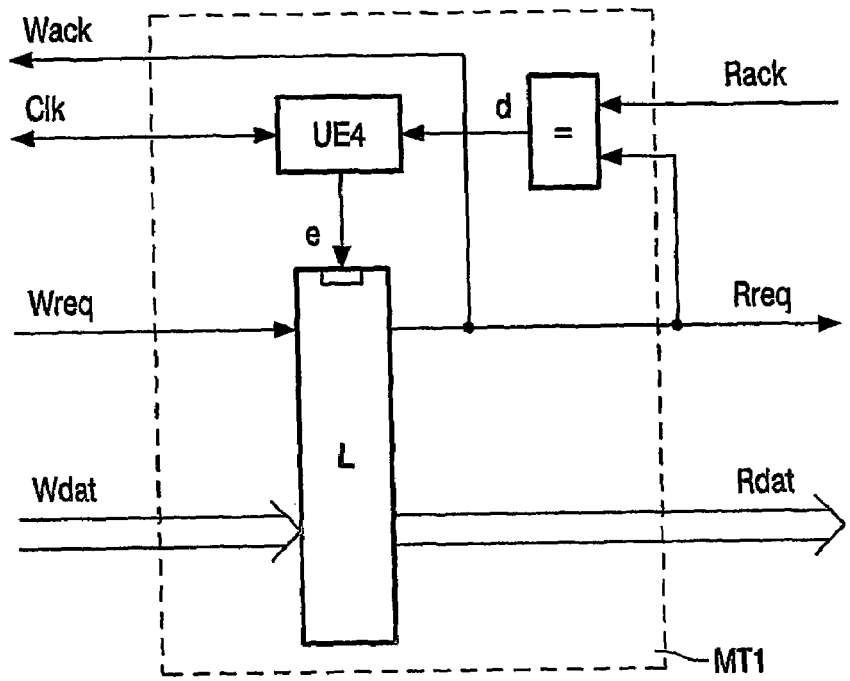
Figure 10A:
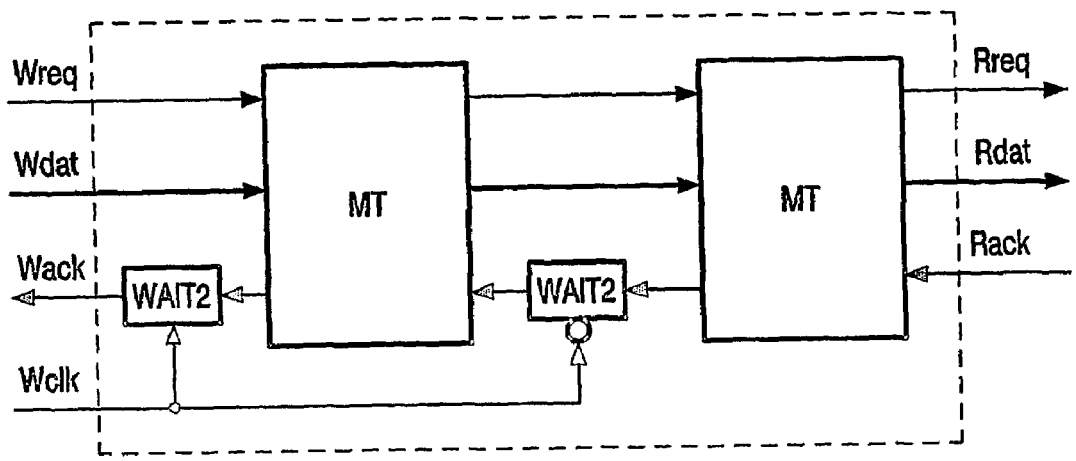
Figure 10B:
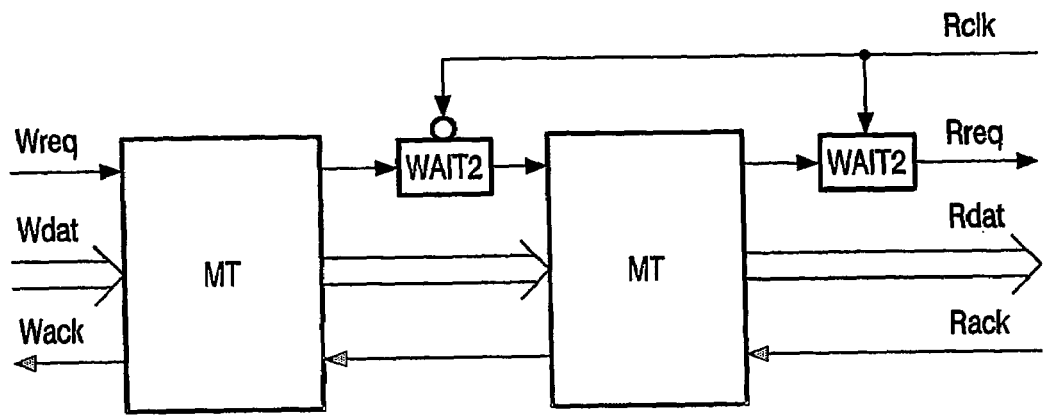

FIG. 2 shows two mousetrap buffers according to the state of the art connected to each other, FIG. 3 shows a write section of a pipeline synchronization device according to a fist embodiment of the present invention, FIG. 4 shows a read section of the pipeline synchronization device according to the first embodiment of the present invention, FIG. 5 shows the synchronizer of the first embodiment of the present invention, FIG. 6 shows the wait-component of the synchronizer of the first embodiment, FIG. 7 shows a synchroniser of a second embodiment of the present invention, FIG. 8 shows a four-phase up-edge component (UE4) used in the synchroniser of FIG. 7, FIG. 9 shows a mousetrap buffer of a pipeline synchronisation device according to a second embodiment of the present invention, FIG. 10a shows a write section of a pipeline synchronisation device according to a third embodiment of the present invention, and FIG. 10b shows a read section of a pipeline synchronisation device according to the third embodiment of the present invention.

Figure 11:
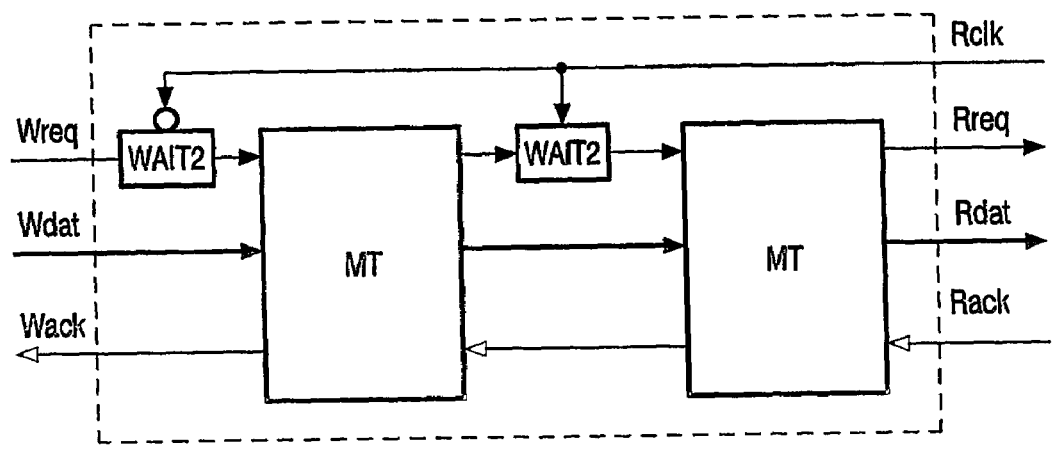

FIG. 11 shows a pipeline synchronisation device according to a fourth embodiment of the present invention.

The write section of the pipeline synchronization device according to the first embodiment shown in FIG. 3 comprises a mousetrap buffer (MT) and a synchronizer (S). The mousetrap buffer MT and the synchronizer S are connected to a write device WD. The write device has an internal clock CLK which is output to the synchronizer S. The synchronizer S synchronizes the write acknowledge signal Wack of the mousetrap buffer MT with the clock CLK of the write device WD. The mousetrap buffer MT in FIG. 3 corresponds to the conventional mousetrap buffer shown in FIG. 1. The write acknowledge signal Wack changes from high to low or from low to high, if the data Wdat have been written to the mousetrap buffer MT. Simultaneously the mousetrap buffer MT is made opaque, which means that further data may not be written into the mousetrap buffer MT. The mousetrap buffer MT changes the read request signal Rreq. This signal change indicates that the data may be read from the mousetrap buffer MT. The synchronizer S delays the transfer of a change in the write acknowledge signal to the write device WD. The change in the write acknowledge signal Wack may consist of both an up edge and a down edge transition. Since the mousetrap buffer MT operates according to a two-phase protocol, both an up edge and a down edge transition of the write acknowledge protocol may indicate, that the buffer has received the write data Wdat. Thereby, the write device is notified, that additional data may not be written to the mousetrap buffer MT until the write acknowledge signal changes once again. The write acknowledge signal must be received in synchronicity with the internal clock of the write device, so that the write device may process the signalling output of the mousetrap buffer MT.

FIG. 4 shows the read section of the pipeline synchronization device according to the first embodiment. The mousetrap buffer MT in FIG. 4 is connected to a read device RD, which reads data Rdat from the mousetrap buffer. The signalling of the mousetrap buffer MT to the read device RD must be synchronized with the clock CLK of the read device RD. To this end a synchronizer S corresponding to the synchronizer S in FIG. 3 is inserted between a read request output of the mousetrap buffer MT and a read request input of the reading device RD. The internal clock of the reading device RD is input to the synchronizer S. The synchronizer S delays the transfer of a change in the read request signal Rreq to the reading device RD. Therefore, the read request signal change is synchronized with the internal clock CLK of the read device.

FIG. 5 shows the synchronizer used in FIG. 3 and 4 according to the first embodiment. The synchronizer S in FIG. 5 comprises a latch L having an input SI and an output SO. The synchronizing input SI in FIG. 5 corresponds to the write acknowledge signal Wack in FIG. 3 and to the read request signal Rreq in FIG. 4. The synchronizing output SO in FIG. 5 corresponds to the output of the synchronizer as to the write device WD in FIG. 3 and to the read device RD in FIG. 4. The synchronizing output SO of the latch L is made equal to the synchronizing input SI of the latch, if a control input E to the latch L is high. A change in the signalling output of the mousetrap buffer MT in FIG. 3 and 4 corresponds to a change in the synchronizing input SI and the synchronizing output SO of the latch L. The transfer of this signalling output transition is synchronized with the clock CLK of the write device WD or the read device RD by means of wait-component wait 4. The wait 4-component synchronizes the control input of the latch L with the external clock CLK. Because of an EXNOR-gate 50 connected to the input SI and the output SO, the input d of the wait-for-component is high, if the input SI and the output SO differ, and low, if SW input SI and the output SO are equal. A change from low to high in the signal d is indicative of a change in the signalling output of the mousetrap buffer MT. The wait 4-component delays an up edge in signal d, until the clock CLK is high. Therefore, the control input D of the latch L may only change from low to high during a high phase of the clock CLK. Consequently, an up edge or a down edge in the signalling output in FIG. 3 and 4 is synchronized with the high phase of the corresponding clocks CLK of the write device WE) or the read device RD.

FIG. 6 shows a design of the wait 4-component in FIG. 5. The wait 4-component comprises an arbiter 60 and an inverter 65. The inverter 65 inverts the clock signal CLK of the external device WD or RD. The arbiter 60 has two outputs. Only one of the two outputs, namely output e, is used in the wait-for-component. Output e of the arbiter 60 is the output that corresponds to the input d of the arbiter 60. This means, that signal e is equal to signal d in all times, unless the second output of the arbiter 60 corresponding to the inverted clock signal input is high.

FIG. 7 shows a two-phase edge synchroniser, which is used in a second embodiment of the present invention. The synchroniser of FIG. 7 has the same design as the synchroniser shown in FIG. 5 with one exception: The wait4-component in FIG. 5 is replaced by a four-phase up-edge component UE4. The four-phase up-phase up-edge component UE4 is designed to synchronise the transition of an up-edge transition in the input signal d with an up-edge of the external clock CLK. The components surrounding the UE4 component are responsible for transforming the four-phase up-edge component UE4 into a synchroniser, which synchronises both the up-edge and the down edge of a signal with an up-edge transition in the clock CLK. The EXNOR-gate 50 has a low output d as long as the input signal SI and output signal SO are equal to each other. If SI and So differ in any way, the EXNOR-gate 50 has a high output d. A down-edge transition in signal SI and an up-edge transition in signal SI both lead to a high output of the EXNOR-gate 50. The EXNOR-gate does not discern between up-edge and down-edge transitions. Therefore, both up-edge and down-edge transitions are synchronised by the component UE4, which receives an up-edge signal d from the EXNOR-gate 50, whenever an up-edge or down-edge transition occurs in the signal SI. The up-edge signal d is synchronised with an up-edge of the clock CLK by the UE4-component. The synchronised signal is output to the control input e of the latch L, which in turn makes the output signal SO equal to the input signal SI. Thereby, a change in the input signal is transferred synchronous with the up-edge of the clock CLK.

FIG. 8 shows the design of a four-phase up-edge component UE4, which may be used in the synchroniser shown in FIG. 7. The component UE4 is constructed by connecting two wait4-components to each other. A first wait4 component receives the signal d, which is to be synchronised. A second wait4 component receives the output ar of the first wait4 component. An inverter 80 inverts the external clock signal CLK. The inverted clock is input to the first wait4 component. The second wait4 component receives the clock signal CLK. An up-edge in the signal input d is only transferred during the low phase of the clock CLK, i.e. when the clock input of the first wait4 component is high. In this case the signal ar input to the second wait4 component is high, but the clock input of the second wait component is low. The output signal e remains low, until the clock CLK goes from low to high. The output ar of the first wait4 component is not affected by a change in the clock CLK as long as the input d is high. Therefore an up edge in signal d is synchronised with an up edge in the clock CLK. At falling clock edges the delay of the inverter 80 takes care of closing the second wait4 component before the first one is opened.

FIG. 9 shows the design of a mousetrap buffer according to a second embodiment of the invention. The mousetrap buffer shown in FIG. 7 has all the components, which the conventional mousetrap buffer shown in FIG. 1 possesses. Identical reference signs in FIG. 1 and 7 indicate the same features. In addition, the mousetrap buffer in FIG. 7 comprises a synchroniser (s). The synchroniser (s) synchronises the signal d output from the EXOR-gate of the mousetrap buffer with the clock of an external write device (not shown). For this purpose the synchroniser (s) receives the clock (CLK) of the write device. The design of the mousetrap buffer is such, that the signalling output (Wack) to the write device is synchronised with the clock (CLK) of the write device. The synchronisation of the signalling output has been integrated into the mousetrap buffer.

The design of the buffer makes use of the fact, that the control input (e) of the latch (L) executes a four-phase-handshake protocol that starts at the arrival of an empty bucket (latch is made transparent). Therefore, the arrival of empty buckets can be synchronised by incorporating a four-phase synchroniser (s) in the latch control of the mousetrap cell. The design of a phase synchroniser is much simpler than the design of an edge synchroniser. Therefore, the synchronisation overhead is reduced. However, since the cell only synchronises the arrival of empty buckets, it can only be used in the write section of the buffer. As a result the performance of the write section is improved. The write section of the mousetrap buffer is in general slower than the read section. Passing a data item (full bucket) from the mousetrap buffer is done via the request signals, whereas the acknowledge signals are used to return an empty bucket. The speed for passing a data item is limited by the delay of the latch. The speed for passing an empty bucket is limited by the delay of the EXNOR-gate and the latch. Therefore, passing empty buckets is the bottleneck, when the buffer runs at full speed. Due to the integration of the synchronising component in the mousetrap buffer, the write section offers about the same performance as the read section.

The UE4 component as integrated in the latch-enable control circuit will synchronize the arrival of Rack with the Clk. After this, the latches are transparent and signal Wack follows signal Wreq directly. As signal Wreq originates from the synchronous domain driven by the Clk, and thus is synchronous with this Clk, signal Wack is also synchronized with the Clk. In a way, during this synchronization, Wack depends combinationally on Wreq, and is merely a delayed version of this signal. In the clocked domain, this assumes a clocked register in the path from Wack to Wreq so as to compute the new value of Wreq for the next clock cycle.

FIG. 10a shows the design of a write section of a pipeline synchronisation device according to the present invention.

The write section is the part of the pipeline that receives data from a write device (not shown). The write section largely corresponds to the asynchronous pipeline comprising two mousetraps shown in FIG. 2. The first mousetrap MT1 in FIG. 10a is connected to a write device WD (not shown). The connection to the write device is established in the same way shown in FIG. 3. The write acknowledge signal of the first mousetrap MT1 is fed to the write device via a synchroniser. A first wait2 synchroniser is used, which synchronises an up-edge and a down-edge transition in the Wack signal of mousetrap MT1 with a high clock phase. A second wait2 component is provided between the first and second mousetrap buffer MT1 and MT2. The write acknowledge signal from the mousetrap 2 is synchronised with an inverted clock signal. This means that a change of the write-acknowledge signal from mousetrap MT2 is only transferred to mousetrap MT1, if the clock is low. The write acknowledge signals are responsible for passing empty buckets from mousetrap to mousetrap. An up-edge or a low-edge in the write acknowledge signal from the second MT2 to the first mousetrap MT2 is transmitted during a low phase of the external clock CLK. Consequently the first mousetrap buffer MT1 is made empty and the state of the write acknowledge signal of the first mousetrap to the write device is changed. If this change takes place during the low phase of the external clock, the signal is not transmitted due to the wait2 component transmitting the signal Wack to the write device WD. The transfer is delayed until the clock is high, i.e. during the up-edge transition of the clock. The design presented in FIG. 10a is an up-edge synchronisation circuit for the write section of a pipeline synchronisation device according to the present invention.

FIG. 10b depicts the corresponding design of a read section of a pipeline synchronisation device according to the present embodiment. This embodiment synchronises the Rreq signal with Rclk, but it has one disadvantage. Since the Rreq is only synchronised with the high period of Rclk, the synchronous domain (assuming it is positive-edge triggered) is actually informed too late about new data arriving at Rdat. Therefore, the synchronous domain has to be allowed one clock cycle to absorb that new data on the next Rclk edge. The dependency of Rack on Rreq thus requires a clock delay (e.g. a flip-flop), which reduces the throughput (as seen from the synchronous domain) by 50%. The preferred embodiment is therefore one where the Rreq signal is not synchronised with Rclk directly, but rather a precursor of it is. This is obtained by shifting the synchronising wait components a single mousetrap stage to the left, as shown in FIG. 11.

FIG. 11 shows another embodiment of the present invention, wherein two wait components are inserted between neighbouring mousetraps consecutively. The wait components both receive an external clock signal, wherein one of said wait components comprises an inverter, which inverts the clock signal received. The difference between the circuit shown in FIG. 11 and the circuit shown in FIG. 10b is the location of the wait components in the pipeline. In FIG. 10b one of the wait components is located at the interface between the pipeline and the external read device. This is not the case in the pipeline shown in FIG. 11. The circuit shown in FIG. 11 is a preferred alternative for the circuit in FIG. 10b, and is to be used for read synchronisation.

The invention claimed is:

1. A pipeline synchronization device for transferring data between clocked devices having different clock frequencies, comprising:

a mousetrap buffer for exchanging data with one of the clocked devices, the mousetrap buffer including a signalling output for coordinating the data exchange with the clocked device, and a synchronizer that is configured to synchronize a change in the signalling output with a clock of the clocked device, wherein the synchronizer includes:

a synchronizing latch includes: a synchronizing input for receiving the signalling output; a synchronizing output for outputting the received signalling output to the clocked device; and a control input for enabling the output of the received signalling output to the clocked device, and an EXNOR-gate having two inputs and one output, the inputs of the EXNOR-gate being connected to the synchronizing input and output of the synchronizing latch, and the synchronizer includes a wait-component having an input connected to the output of the EXNOR-gate, an input connected to the clock of the clocked device and an output connected to the control input of the synchronizing latch.

2. The device of claim 1, wherein the synchronizer synchronizes the change in the signalling output with a high phase or a low phase of the clock of the external device.

3. The device of claim 2, wherein the synchronizer delays a transfer of the change in the signalling output until the clock of the clocked device is in a given state.

4. The device of claim 1, wherein the wait-component signals a change from low to high of the input if the clock of the clocked device is in a given state, and signals a change from high to low of the input irrespective of the state of the clock of the clocked device.

5. The device of claim 4, wherein the wait-component comprises an inverter and an arbiter having an input for receiving an inverted clock signal from the inverter, and an input for receiving the output of the EXNOR-gate and an output for transmitting the input.

6. The device of claim 1, wherein the synchronizer synchronizes the change in the signalling output with a rising and/or a falling edge of the clock of the clocked device.

7. The device of claim 6, wherein the synchronizer includes two synchronizers for delaying a transfer of a change in the signalling output until the clock of the clocked device is in a given state, wherein a first of the two synchronizers transfers a change in the signalling output of a first mousetrap buffer to the clocked device and wherein a second of the two synchronizers receives an inverted clock of the clocked device and transfers a signalling output of a second mousetrap buffer to the first mousetrap buffer.

8. The device of claim 6, wherein the synchronizer includes an edge synchronizer that includes two wait-components, each signaling a change from low to high in the input if a received clock is in a given state, and signaling a change from high to low in the input irrespective of the state of the received clock, wherein a first of the two wait-components receives the clock of the clocked device and signals a change in its input to the clocked device, and wherein a second of the two wait components receives an inverted clock from the clocked device and signals a change in its input to the first wait component.

9. The device of claim 8, wherein the synchronizer includes a synchronizing latch having a synchronizing input for receiving the signalling output, a synchronizing output for outputting the received signalling output to the clocked device and a control input for enabling the output of the received signalling output to the clocked device.

10. The device of claim 9, wherein the synchronizer includes an EXNOR-gate having two inputs and one output, the inputs of the EXNOR-gate being connected to the synchronizing input and output of the synchronizing latch, and the synchronizer includes an edge synchronizer having an input connected to the output of the EXNOR-gate, an input connected to the clock of the clocked device and an output connected to the control input of the synchronizing latch.

11. The device of claim 1, wherein the mousetrap buffer receives data from the clocked device and the mousetrap buffer includes a signalling output for acknowledging the receipt of data to the clocked device.

12. The device of claim 11, wherein the mousetrap buffer includes an EXOR-gate for receiving a read request signal and a read acknowledge signal, a latch having a control input for enabling and disabling the receiving and transferring of data, wherein the synchronizer synchronizes an output of the EXOR-gate with the clock of the clocked device and supplies the output of the EXOR-gate to the control input of the latch.

13. The device of claim 12, wherein the synchronizer synchronizes a change in the output of the EXOR-gate with a rising and/or a falling edge of the clock of the clocked device.

14. The device of claim 1, wherein the mousetrap buffer transfers data to the clocked device and the mousetrap buffer includes a signalling output for requesting the transfer of data to the clocked device.

15. A method for transferring data between clocked devices having different clock frequencies, comprising:

exchanging data with one of the clocked devices via a mousetrap buffer that is configured to output a signal for coordinating the data exchange with the clocked device, and synchronizing changes in the output signal with the clock of the clocked device using a synchronizer, wherein the synchronizer includes:

a synchronizing latch includes: a synchronizing input for receiving the signalling output; a synchronizing output for outputting the received signalling output to the clocked device; and a control input for enabling the output of the received signalling output to the clocked device, and an EXNOR-gate having two inputs and one output, the inputs of the EXNOR-gate being connected to the synchronizing input and output of the synchronizing latch, and the synchronizer includes a wait-component having an input connected to the output of the EXNOR-gate, an input connected to the clock of the clocked device and an output connected to the control input of the synchronizing latch.

* * * * *